United States Patent
Neidorff et al.

(10) Patent No.: US 11,677,323 B2
(45) Date of Patent: Jun. 13, 2023

(54) PROGRESSIVE POWER CONVERTER DRIVE

(71) Applicant: TEXAS INSTRUMENTS INCORPORATED, Dallas, TX (US)

(72) Inventors: Robert Allan Neidorff, Bedford, NH (US); Robert Kenneth Oppen, Phoenix, AZ (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 124 days.

(21) Appl. No.: 17/135,532

(22) Filed: Dec. 28, 2020

(65) Prior Publication Data
US 2022/0209667 A1 Jun. 30, 2022

(51) Int. Cl.
*H02M 3/158* (2006.01)
*H02M 3/157* (2006.01)
*H02M 1/00* (2006.01)

(52) U.S. Cl.
CPC ........ *H02M 3/1582* (2013.01); *H02M 1/0038* (2021.05); *H02M 3/157* (2013.01)

(58) Field of Classification Search
CPC ...... H02M 3/157; H02M 3/1582; H02M 1/08; H02M 1/088; H02M 1/44
See application file for complete search history.

(56) References Cited

U.S. PATENT DOCUMENTS

| 6,249,111 | B1 * | 6/2001 | Nguyen | H02M 3/1588 |
| | | | | 323/282 |
| 7,391,133 | B1 * | 6/2008 | Hennessy | H03K 17/92 |
| | | | | 307/115 |
| 7,746,123 | B2 | 6/2010 | Hester et al. | |
| 8,148,957 | B2 * | 4/2012 | Zhang | H02M 1/088 |
| | | | | 323/272 |
| 8,604,717 | B2 | 12/2013 | Lee | |
| 8,817,497 | B2 | 8/2014 | Zheng et al. | |
| 9,419,605 | B2 * | 8/2016 | Ishikawa | H02M 1/088 |
| 9,793,806 | B2 | 10/2017 | Chang | |
| 2003/0038615 | A1 * | 2/2003 | Elbanhawy | H02M 3/1584 |
| | | | | 323/282 |

(Continued)

FOREIGN PATENT DOCUMENTS

EP    2154784 A1 *  2/2010  .......... H03K 17/168

*Primary Examiner* — Kyle J Moody
*Assistant Examiner* — Jye-June Lee
(74) *Attorney, Agent, or Firm* — Frank D. Cimino

(57) ABSTRACT

In at least some examples, an apparatus includes a logic circuit, first transistor, and second transistor. The logic circuit has a first logic circuit output, and a second logic circuit output. The first transistor has a first transistor gate, a first transistor source, and a first transistor drain, the first transistor gate coupled to the first logic circuit output, the first transistor drain adapted to couple to a voltage source, and the first transistor source coupled to a switching terminal. The second transistor has a second transistor gate, a second transistor source, and a second transistor drain, the second transistor gate coupled to the second logic circuit output, the second transistor drain adapted to couple to the voltage source, and the second transistor source coupled to the switching terminal, wherein a transistor width of the second transistor is larger than a transistor width of the first transistor.

20 Claims, 4 Drawing Sheets

(56) References Cited

U.S. PATENT DOCUMENTS

2013/0342262 A1\* 12/2013 Konstantinov .... H03K 17/0414
    327/375
2018/0262193 A1\* 9/2018 Pidutti ................... H02M 3/07
2021/0167758 A1\* 6/2021 Young ................. H03K 17/164

\* cited by examiner

PROGRESSIVE POWER CONVERTER DRIVE

BACKGROUND

A switched mode power supply (SNIPS) transfers power from an input power source to a load by switching one or more power transistors or other switching elements coupled through a switch node/terminal to an energy storage element (such as an inductor, transformer via an inductance of the transformer, and/or capacitor), which is capable of coupling to the load. The power transistors can be a part of a power converter that includes, or is capable of coupling to, the energy storage element. An SMPS can include an SMPS controller to provide one or more gate drive signals to the power transistor(s). Based on the switching elements being switched on or off, rapid changes in current in the SMPS can cause ringing to exist at a switch node of the SNIPS.

SUMMARY

In at least some examples, an apparatus includes a logic circuit, a first transistor, and a second transistor. The logic circuit has a first logic circuit output, and a second logic circuit output. The first transistor has a first transistor gate, a first transistor source, and a first transistor drain, the first transistor gate coupled to the first logic circuit output, the first transistor drain adapted to couple to a voltage source, and the first transistor source coupled to a switching terminal. The second transistor has a second transistor gate, a second transistor source, and a second transistor drain, the second transistor gate coupled to the second logic circuit output, the second transistor drain adapted to couple to the voltage source, and the second transistor source coupled to the switching terminal, wherein a transistor width of the second transistor is larger than a transistor width of the first transistor.

In at least some examples, an apparatus includes a logic circuit, first switching element, and a second switching element. The logic circuit has a logic circuit first output, a logic circuit second output, and a logic circuit third output. The first switching element is adapted to couple between a voltage source and a switching terminal. The first switching element includes a first transistor having a first transistor gate, a first transistor source, and a first transistor drain, the first transistor gate coupled to the logic circuit first output, the first transistor drain adapted to couple to the voltage source, and the first transistor source coupled to the switching terminal. The first switching element also includes a second transistor having a second transistor gate, a second transistor source, and a second transistor drain, the second transistor gate coupled to the logic circuit second output, the second transistor drain adapted to couple to the voltage source, and the second transistor source coupled to the switching terminal. The second switching element includes a third transistor that has a third transistor gate, a third transistor source, and a third transistor drain, the third transistor gate coupled to the logic circuit third output, the third transistor drain coupled to the switching terminal, and the third transistor source adapted to couple to ground.

In at least some examples, an apparatus includes a logic circuit and a switching element. The logic circuit has a logic circuit input and multiple logic circuit outputs. The switching element has multiple parallel-coupled transistors adapted to couple between a voltage source and a switching terminal, each of the multiple parallel-coupled transistors having a gate coupled to a respective one of the multiple logic circuit outputs. The logic circuit is configured to receive a pulse-width modulation signal at the logic circuit input for controlling the switching element, provide a first gate control signal based on the pulse-width modulation signal to a gate of a first of the multiple parallel-coupled transistors, and provide a second gate control signal based on the pulse-width modulation signal to a gate of a second of the multiple parallel-coupled transistors, where the second of the multiple parallel-coupled transistors has a smaller drain-to-source on resistance than the first of the multiple parallel-coupled transistors.

DETAILED DESCRIPTION

Figure 1:
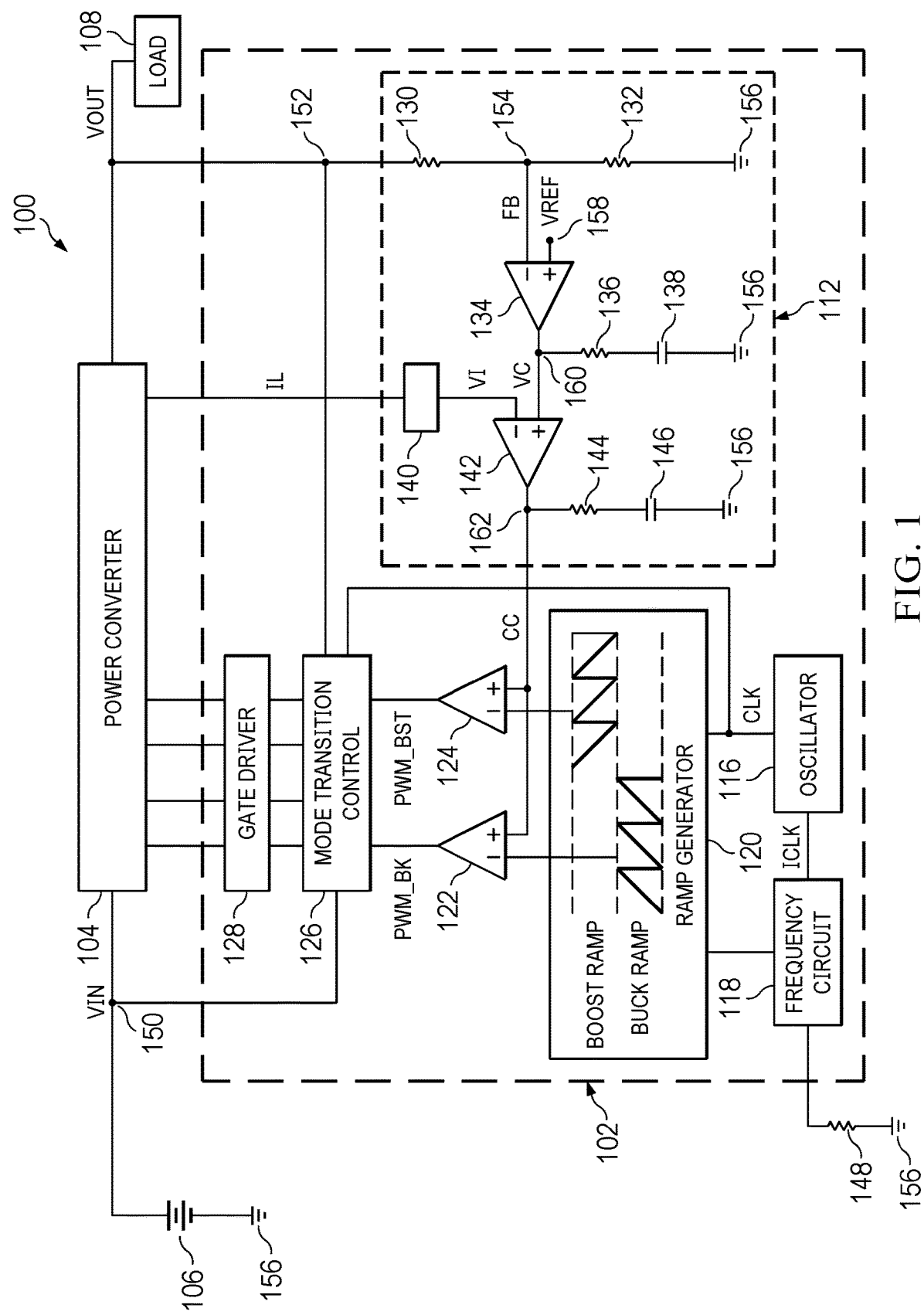
FIG. 1 is a block diagram of an example SMPS in accordance with various examples.

In some device architectures, a switched mode power supply (SMPS) includes, or is capable of coupling to, an output/bulk capacitor in parallel with the load. A SMPS controller switches power transistor(s) to form circuit arrangements with energy storage element(s) to supply a load current to the load and/or to the output/bulk capacitor to maintain a regulated output voltage (e.g., by filtering the switched load current). Alternatively, though not shown herein, at least some of the power transistors can instead be implemented as passive switches, such as diodes. A power transistor can be coupled through the switch node/terminal to an inductor during charging and/or discharging switching cycles of a power converter. The inductor is switched by the SMPS controller between charge and discharge switching cycles to supply inductor current (e.g., current through the inductor) to the load and to the output/bulk capacitor to filter the inductor current (such that the inductor and the output/bulk capacitor together filter a voltage provided at the switch node) to maintain the regulated output voltage. As described above, in at least some alternate examples, one or more of the power transistors are replaced by passive switches that react based on characteristics of a received input signal and are not switched by the SMPS controller. In some implementations, an SMPS can be configured for operation as a constant current source with an energy storage element but with no output/bulk capacitor. Also, as used herein, a switching cycle may be periodic or non-periodic.

The power transistors can be implemented as field effect transistors (FETs), metal oxide semiconductor FETs (MOSFETs) or any other suitable solid-state transistor devices (e.g., such as bipolar junction transistors (BJTs)). As an input voltage (VIN), or an output voltage (VOUT), of the power converter varies, the SMPS controller may control the power converter to operate in different modes of operation. For example, based on VIN being greater than VOUT, the SMPS controller may control the power converter to operate in a buck mode of operation. Based on VIN being less than VOUT, the SMPS controller may control the power converter to operate in a boost mode of operation. Based on VIN being approximately equal to VOUT, the SMPS controller may control the power converter to operate in a buck-boost mode of operation. The above examples are non-exclusive and apply generally to a power converter of buck-boost topology or architecture. However, at least some of the above examples also apply to power converters of other topologies or architectures, such as buck or boost, operating under certain modes of control, such as peak or valley control.

To control a mode of operation of the power converter, the SMPS controller provides gate control signals to one or more power transistors of the power converter. A value of each of these gate control signals with respect to a value of another signal received by a respective power transistor determines whether the respective power transistor receiving the gate control signal is in a conductive state (e.g., turned on) or in a non-conductive state (e.g., turned off). To change a mode of operation of the power converter, the SMPS controller modifies a value of one or more of the gate control signals to turn one or more of the power transistors on or off. In at least some examples, the SMPS controller implements a state machine or other logic such that values of the gate control signals are determined based on a state of control for the power converter. Also, while remaining in a mode of operation of the power converter, the SMPS controller may modify a value of one or more of the gate control signals to alternatively turn on and turn off one or more power transistors.

Based on a gate-to-source voltage (VGS) of each of the power transistors caused by values of the gate control signals and signals that exist at source terminals of the respective power transistors, the power transistors turn on and conduct current between their drain and source terminals or turn off and inhibit the conduction of current between their drain and source terminals. Based on a power transistor turning on, or off, a rapid change in current in a conductor coupled to the power transistor occurs, or the conductor experiences a large change in current over change in time (di/dt). In at least some examples, gate drive switching faster than one volt per nanosecond is sufficient to cause a di/dt that creates ringing as described herein. The conductor may be a wire bond, a printed circuit board (PCB) trace, a lead frame finger in an integrated circuit (IC) package, or any other conductor that is coupled to a component in a circuit. The conductor, in at least some examples, has some non-zero resistance, inductance, and capacitance. In the presence of the large di/dt, a proportionally large voltage exists on the conductor as a result of the inductance of the conductor. The combination of the inductance of the conductor and the capacitance of the conductor, as well as other circuits coupled to the conductor, cause the conductor to function as a resonant circuit, damped by the resistance of the conductor (and one or more power transistors coupled to the conductor), which causes voltage ringing at the switch node of the SMPS. The quality factor at the switch node is approximately represented by $$Q = \frac{1}{R}\sqrt{\frac{L}{C}},$$

where Q is the quality factor, R is an effective resistance that exists at the switch node, L is an effective inductance that exists at the switch node, and C is an effective capacitance that exists at the switch node. The voltage ringing, in some implementations, is at a frequency sufficient to cause electromagnetic interference (EMI) that can exceed specified limits. These limits can be specified, in various examples, by regulatory or governing bodies, industry collaborations, or other agreements.

By increasing a resistance of the power transistor coupled to the conductor when the power transistor is turned on (e.g., Ron), the quality factor decreases in value and the voltage ringing at the switch node decreases in amplitude. However, as Ron increases in value, power dissipated, or lost, to heat in operation of the power transistor increases. This increase in power loss decreases efficiency of the power transistor and SMPS. Therefore, industry trends for at least some SMPS architectures are for the reduction in Ron of power transistors to increase efficiency. The reduction in Ron, however, inhibits the increased damping of the ringing at the switch node described above, creating competing interests that each have both benefit and detriment to efficiency and operation of the SMPS.

Some examples of a power converter of a SMPS include a high-side power transistor and a low-side power transistor. Some implementations of the power converter implement the high-side power transistor and/or the low-side power transistor as multiple devices coupled in parallel rather than as a single device, respectively. For example, rather than the high-side power transistor and/or the low-side power transistor being respectively implemented as single power transistors, some implementations of the power converter implement the high-side power transistor and/or the low-side power transistor as multiple parallel-coupled power transistors. The parallel-coupled power transistors, in at least some examples are sized approximately the same such that they have approximately equal values of Ron. In other examples, at least some of the parallel-coupled power transistors have different sizes than other of the parallel-coupled power transistors such that some of the parallel-coupled power transistors have different values of Ron than other of the parallel-coupled power transistors. The values of gate control signals provided to the parallel-coupled power transistors are controlled such that during a first time period a first portion of the parallel-coupled power transistors are controlled to be turned on and conductive. The values of the gate control signals provided to the parallel-coupled power transistors are further controlled such that during a second time period a second portion of the parallel-coupled power transistors are controlled to be turned on and conductive. In this way, the parallel-coupled power transistors can be controlled to increase a slew rate of a switch node to which each of the parallel-coupled power transistors is coupled, reducing ringing that exists or occurs at the switch node.

Referring to FIG. 1, an example of a block diagram of an example SMPS 100 is shown. In at least one example, the SMPS 100 includes a controller 102 and a power converter 104. The SMPS 100, at least through the power converter 104, switches power provided based on a power source 106 from a node 150 to a load 108. In some examples, the power converter 104 is a buck-boost power converter that is capable of operating according to a buck mode of operation, a boost mode of operation, and a buck-boost mode of operation. In at least one example, the controller 102 includes, or is adapted to be coupled to, a feedback circuit 112, an oscillator 116, a frequency circuit 118, a ramp generator 120, a comparator 122, a comparator 124, a mode transition control circuit 126, and a gate driver 128. The SMPS 100 of this description is shown and described as implementing average current mode control over the power converter 104. However, other control methods are possible, such as peak current mode control, voltage mode control, or any other suitable form of control implemented in a fixed frequency or variable frequency system.

At least one example of the SMPS 100 includes at least some aspects of the controller 102 and/or the power converter 104 on a same semiconductor die and/or in a same component package, while in other examples the controller 102 and/or the power converter 104 may be fabricated separately and/or adapted to couple together. For example, at least some aspects of the controller 102 may be fabricated separately and coupled together. Accordingly, while shown as including the gate driver 128, in at least one example the controller 102 does not include the gate driver 128 and instead is adapted to be coupled to the gate driver 128. Similarly, other components shown as being a part of the controller 102 may instead be adapted to couple, in whole or in part, to the controller 102 and not be included on a same semiconductor die and/or in a same component package as the controller 102.

In at least one example, the feedback circuit 112 includes a resistor 130 coupled between a node 152 and a node 154 and a resistor 132 coupled between the node 154 and a ground node 156. The feedback circuit 112 further includes an amplifier 134 having a first input terminal (e.g., a non-inverting input terminal) coupled to a node 158 and configured to receive a reference voltage (VREF) at the node 158. The amplifier 134 further has a second input terminal (e.g., an inverting input terminal) coupled to the node 154, and an output terminal coupled to a node 160. A feedback signal (FB) exists at the node 154 and is a scaled representation of VOUT, scaled according to a ratio of resistance of the resistor 132 to a total resistance of the resistor 130 and the resistor 132. A signal (VC) exists at the node 160 and is provided by the amplifier 134 based on a difference between VREF and FB. A resistor 136 is coupled between the node 160 and a top plate of a capacitor 138 and a bottom plate of the capacitor 138 is coupled to the ground node 156. The feedback circuit 112 further includes a current sense circuit 140 and an amplifier 142. The current sense circuit 140 is adapted to be coupled to the power converter 104 to provide an output signal (VI) that is a voltage representation of a current flowing through the power converter 104. The amplifier 142 has a first input terminal (e.g., a positive or non-inverting input terminal) coupled to the node 160, a second input terminal (e.g., a negative or inverting input terminal) coupled to an output terminal of the current sense circuit 140, and an output terminal coupled to a node 162. A current control signal (CC) exists at the node 162 and is provided by the amplifier 142 based on a difference between VC and VI. A resistor 144 is coupled between the node 162 and a top plate of a capacitor 146 and a bottom plate of the capacitor 146 is coupled to the ground node 156.

The oscillator 116, in at least some examples, is any component or components suitable for generating a clock signal, shown in FIG. 1 as CLK. A frequency of CLK is determined, in at least some examples, based on a value of a signal received from the frequency circuit 118. For example, the frequency circuit 118 provides a current signal, shown in FIG. 1 as ICLK, based at least partially on a value of a resistor 148 coupled to the frequency circuit 118. The frequency circuit 118 provides ICLK to the oscillator 116 to enable the oscillator 116 to provide CLK at least partially according to ICLK. In at least some examples, the frequency circuit 118 further provides ICLK to the ramp generator 120. The oscillator 116 provides CLK to, in some examples, the ramp generator 120 and the mode transition control circuit 126.

The ramp generator 120, in at least some examples, is any component or components suitable for generating buck and boost ramp signals for use in controlling the power converter 104. In at least some examples, the buck and boost ramp signals are provided by charging and resetting (e.g., discharging) one or more capacitors (not shown) at a specified rate of charge, specified by a current value of a signal charging the one or more capacitors. In at least some examples, based on the received CLK and ICLK signals, the ramp generator 120 provides the buck ramp signal and the boost ramp signal.

The comparator 122 includes a first input terminal (e.g., a positive or non-inverting input terminal) coupled to the node 162, a second input terminal (e.g., a negative or inverting input terminal) coupled to the ramp generator 120 and configured to receive the buck ramp signal from the ramp generator 120, and an output terminal. The comparator 124 includes a first input terminal (e.g., a positive or non-inverting input terminal) coupled to the node 162, a second input terminal (e.g., a negative or inverting input terminal) coupled to the ramp generator 120 and configured to receive the boost ramp signal from the ramp generator 120, and an output terminal. In at least some examples, a control signal, shown in FIG. 1 as PWM_BK, exists at the output terminal of the comparator 122 and a control signal, shown in FIG. 1 as PWM_BST, exists at the output terminal of the comparator 124. In some examples, PWM_BK has an asserted value responsive to CC being greater in value than the buck ramp and a de-asserted value responsive to CC being less in value than the buck ramp. Similarly, in some examples, PWM_BST has an asserted value responsive to CC being greater in value than the boost ramp and a de-asserted value responsive to CC being less in value than the boost ramp.

The mode transition control circuit 126 has multiple input terminals collectively configured to receive at least CLK, PWM_BK, PWM_BST, VOUT, and VIN (collectively referred to with respect to the mode transition control circuit 126 as the received signals). In at least some examples, the mode transition control circuit 126 includes or implements a state machine to provide one or more control signals for controlling the power converter 104 according to the received signals. Operation of the mode transition control circuit 126 is described in greater detail below.

In at least one example, the SMPS 100 is configured to receive VIN from the power source 106 at the node 150 and provide VOUT at the node 152 for supplying the load 108. VOUT is based at least partially on VIN as provided at the node 150 and VREF as received by the SMPS 100 at the node 158. VREF may be received from any suitable device (not shown) such as a processor, microcontroller, or any other device exerting control over the SMPS 100 to control a value of VOUT. In at least one example, VREF has a value representative of a specified (e.g., user-specified, target, preconfigured, programmed, etc.) value of FB. Accordingly, in at least some implementations, the controller 102 receives one or more signals from the power converter 104. For example, the controller 102 may receive VOUT from the power converter 104 and/or an inductor current (IL) of the power converter 104. In various examples, IL may be a value directly measured from an inductor (not shown) of the power converter 104 (or a terminal of another component of the power converter 104 to which the inductor is also coupled) or a value sensed from a sense element (not shown) of the power converter 104. In various examples, the sense element is a sense resistor, a transistor, or any other component or combination of components capable of measuring IL of the power converter 104 and providing a value representative of IL to the controller 102. In at least one example, the value representative of IL is provided to the feedback circuit 112 for generation of VI and VOUT is provided to the feedback circuit 112 and the mode transition control circuit 126.

In at least one example, the feedback circuit 112 is configured to receive VREF and VOUT and provide VC indicating a variation in FB from VREF. VC is referred to in some examples as an error signal. In at least some examples, FB is an output of a voltage divider formed of the resistor 130 and the resistor 132, where an input to the voltage divider is VOUT. VC is subsequently filtered by the resistor 136 and the capacitor 138 before being received by the amplifier 142. The amplifier 142, in at least one example, is configured to receive VC and VI and provide CC indicating a variation in VI from VC. CC is subsequently filtered by the resistor 144 and the capacitor 146 before being received by the comparator 122 and the comparator 124.

As described above, in at least one example, the frequency circuit 118 provides a signal ICLK based on a resistance of the resistor 148. ICLK at least partially determines a frequency of a clock signal CLK provided by the oscillator 116.

The mode transition control circuit 126 receives CLK, PWM_BK, PWM_BST, VOUT, and VIN and provides control signals for controlling the gate driver 128 to control the power converter 104. In at least one example, the mode transition control circuit 126 includes or otherwise implements a digital state machine to provide the control signals based on values of CLK, PWM_BK, PWM_BST, VOUT, and/or VIN.

Based on the control signals received from the mode transition control circuit 126, the gate driver 128 provides gate control signals for controlling power transistors of the power converter 104, as described above. For example, the gate driver 128 provides gate control signals that alternatingly, and selectively, turn the power transistors of the power converter 104 on and off to energize and de-energize elements such as an inductor and/or a capacitor (each not shown). This energizing and de-energizing provides the buck, boost, and/or buck-boost functionality described herein. The gate driver 128 is implemented according to any suitable architecture, the scope of which is not limited herein.

As described above, in at least some examples, the controlling (e.g., switching) of the power transistors of the power converter 104 (e.g., the switching on and off) creates ringing at a switch node of the power converter 104. Also as described above, in some examples this ringing can create EMI that adversely affects operation of the power converter 104, SMPS 100, the load 108, and/or a device (not shown) located proximate to the SMPS 100. To mitigate the ringing, in at least some examples the power converter 104 implements one or more power transistors as multiple parallel-coupled devices. For example, in some implementations the power converter 104 includes a high-side switching element (not shown) that includes multiple parallel-coupled power transistors. Also, or alternatively, the power converter 104 may include a low-side switching element (not shown) that includes multiple parallel-coupled power transistors. In some of such implementations, the power converter 104 further includes a logic circuit (not shown) that controls switching of the multiple parallel-coupled power transistors. For example, the logic circuit may receive a gate control signal, such as provided by the gate driver 128 or the mode transition control circuit 126, and provide multiple new gate control signals based on the received gate control signal. The multiple new gate control signals may be configured to control the multiple parallel-coupled power transistors according to any suitable methodology. For example, the multiple new gate control signals may be configured to control the multiple parallel-coupled power transistors such that a first of the multiple parallel-coupled power transistors turns on prior to more of the multiple parallel-coupled power transistors turning on. In another example, the multiple new gate control signals may be configured to control the multiple parallel-coupled power transistors such that a first portion of the multiple parallel-coupled power transistors turns on for a first period of time, a second portion of the multiple parallel-coupled power transistors turns on for a second period of time, and a third portion of the multiple parallel-coupled power transistors turns on of a third period of time. In at least some implementations of such an example, the third portion of the multiple parallel-coupled power transistors includes at least, or is the same as, the first portion of the multiple parallel-coupled power transistors.

Figure 2:
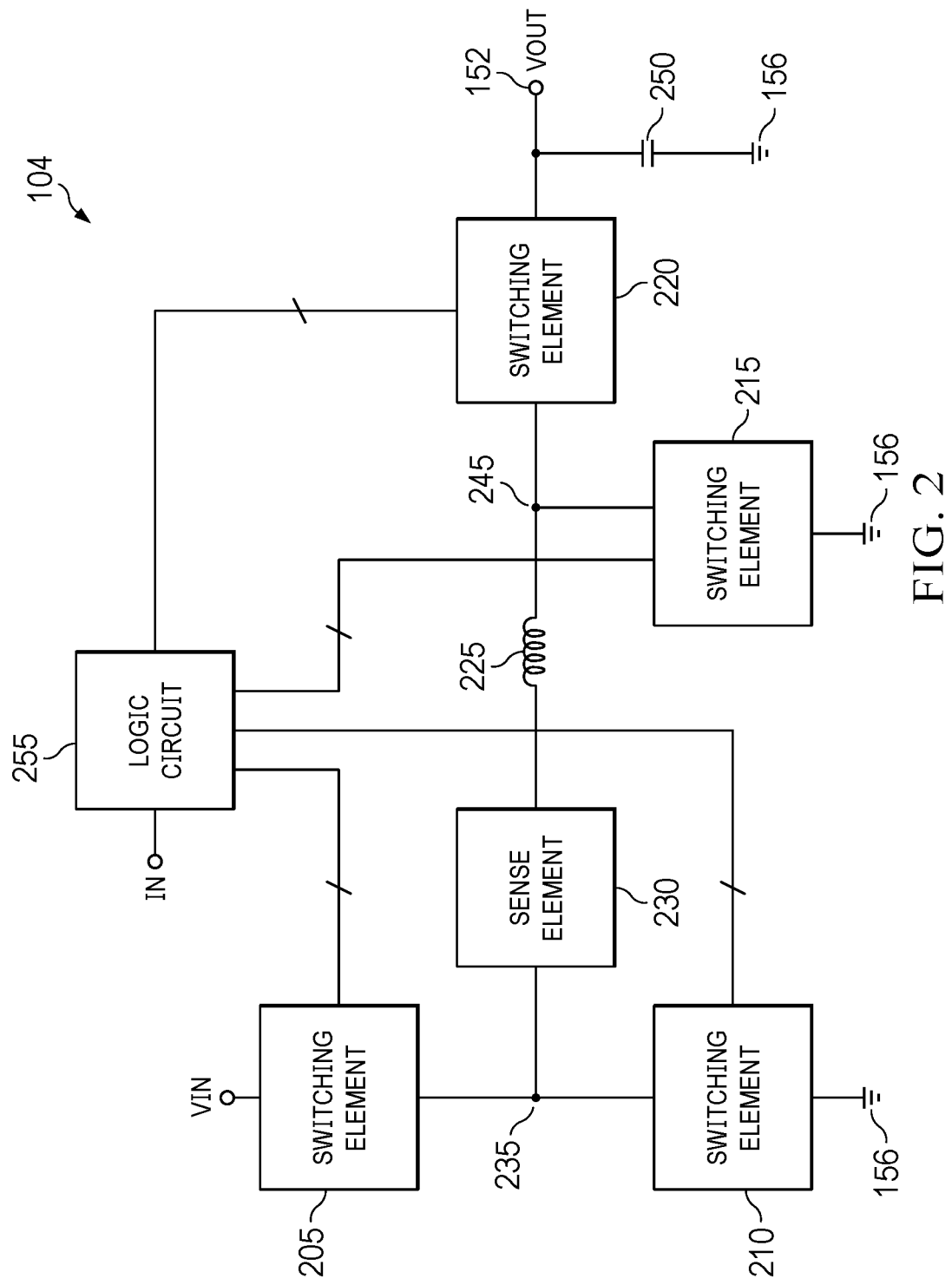
FIG. 2 is a schematic diagram of an example power converter in accordance with various examples.

Referring to FIG. 2, an example of a schematic diagram of an example power converter 104 is shown. Accordingly, reference is made to at least some components or signals of FIG. 1 in describing FIG. 2. As shown and described herein, the power converter 104 is a buck-boost power converter. However, in some examples of operation the power converter 104 may be controlled to operate as a buck power converter or a boost power converter. Alternatively, one or more components may be omitted from the power converter 104 to change the power converter 104 from a buck-boost power converter to only a buck power converter or only a boost power converter. Although the logic circuit 255 is described with respect to FIG. 2 as being a component of the power converter 104, in some implementations the logic circuit is not a component of the power converter 104 and is instead adapted to couple to the power converter 104.

In one example, the power converter 104 includes switching elements 205, 210, 215, and 220, and at least one energy storage device (shown in this example as an inductor 225). In another example, the power converter 104 further includes a second inductor (not shown) and/or a fly-capacitor (not shown). In at least some examples, at least some of the switching elements 205, 210, 215, and/or 220 are implemented as single FET devices. In other examples, at least some of the switching elements 205, 210, 215, and/or 220 are implemented as multiple parallel-coupled FET devices. In yet other examples, at least some of the switching elements 205, 210, 215, and/or 220 are implemented as passive switching devices, such as diodes. In one example, the switching elements 205, 210, 215, and 220 are each implemented as one or more MOSFET devices of p-type or n-type process. In at least one example, the power converter 104 further includes a sense element 230 suitable for sensing IL of the inductor 225 and generating the signal representative of IL. In various examples, the sense element 230 is a FET, a MOSFET, a resistor, or any other suitable circuit capable of, or having a means of, or for, sensing, measuring, or detecting IL. In at least one example, the sense element 230 is implemented by one of the switching elements 205, 210, 215, or 220 such that the sense element 230 is not an independent, additional component of the power converter 104. Further, in at least some examples, the sense element 230 also functions as, or is a component of, the current sense circuit 140 such that the sense element 230 may not be a part of a semiconductor die that includes components of the power converter 104.

In an example architecture of the power converter 104, the switching element 205 is coupled between the node 150 and the node 235 and is configured to receive a control signal from a controller. The controller is, in some examples, the logic circuit 255. In other examples, the controller is, or is a component of, the controller 102. The switching element 210 is coupled between the node 235 and the ground node 156 and is configured to receive a control signal from the controller. The inductor 225 is coupled, or adapted to be coupled, at a first terminal to the node 235 and at a second terminal to the node 245. Said another way, the node 235 and the node 245 are adapted to be coupled together through, or via, the inductor 225. In at least one example, the sense element 230 is coupled in series between the node 235 and the first terminal of the inductor 225. The switching element 215 is coupled between the node 245 and the ground node 156 and is configured to receive a control signal from the controller. The switching element 220 is coupled between the node 245 and the node 152 and is configured to receive a control signal from the controller. In at least one example, the inductor 225 is implemented as an external component such that the power converter 104 does not include the inductor 225 but is adapted to couple to the inductor 225 between the node 235 and the node 245. In at least one example, the power converter 104 is adapted to couple to a capacitor 250 (e.g., such as a bulk capacitor) between the switching element 220 and the ground node 156.

When the switching elements 205, 210, 215, and 220 are each implemented as single FET devices, the switching elements 205, 210, 215, and 220 may each be considered to have a drain, a source, and a gate. When one or more of the switching elements 205, 210, 215, and/or 220 are implemented as multiple parallel-coupled FET devices, the switching elements 205, 210, 215, and/or 220 may each be considered to have a drain (e.g., drains of each of the respective multiple parallel-coupled FET devices coupled in parallel), a source (e.g., sources of each of the respective multiple parallel-coupled FET devices coupled in parallel), and multiple gates (e.g., each of the respective multiple parallel-coupled FET devices having a separately controllable gate). In such examples, the switching element 205 has a drain coupled to the node 150, a source coupled to the node 235, and gate(s) coupled to the controller. Similarly, the switching element 210 has a drain coupled to the node 235, a source coupled to the ground node 156, and gate(s) coupled to the controller. Further, the switching element 215 has a drain coupled to the node 245, a source coupled to the ground node 156, and gate(s) coupled to the controller. Also, the switching element 220 has a drain coupled to the node 152, a source coupled to the node 245, and gate(s) coupled to the controller.

In an example of operation, the switching elements 205, 210, 215, and/or 220 are controlled to turn on (e.g., conduct current between their respective drain terminals and source terminals) and/or turn off (e.g., cease conducting current between their respective drain terminals and source terminals) based on a signal received at respective gate terminals. For example, based on a gate control signal received from the controller, one or more of the switching elements 205, 210, 215, and/or 220 are controlled to turn on or turn off. The switching elements 205, 210, 215, and/or 220 may turn on (or off) based on a value, or relationship between values, provided at one or more of their respective gate terminals and/or source terminals. Based on which of the switching elements 205, 210, 215, or 220 are turned on at a given time, which of the switching elements 205, 210, 215, or 220 are turned off at a given time, and a sequence of turning on and/or off the switching elements 205, 210, 215, and/or 220, the power converter 104 operates in a buck mode of operation, a boost mode of operation, or a buck-boost mode of operation.

For the sake of description the switching element 205 will be described as having multiple parallel-coupled FETs. However, the switching elements 210, 215, and/or 220 may also include multiple parallel-coupled FETs, as described above, and a principle of operation of the switching elements 210, 215, and/or 220 may be substantially similar to that of the switching element 205. Further, the architecture and operation of the switching element 205 is not limited to applicability in the power converter 104, but is instead applicable and may have utility in other applications that include a switching element.

Figure 3:
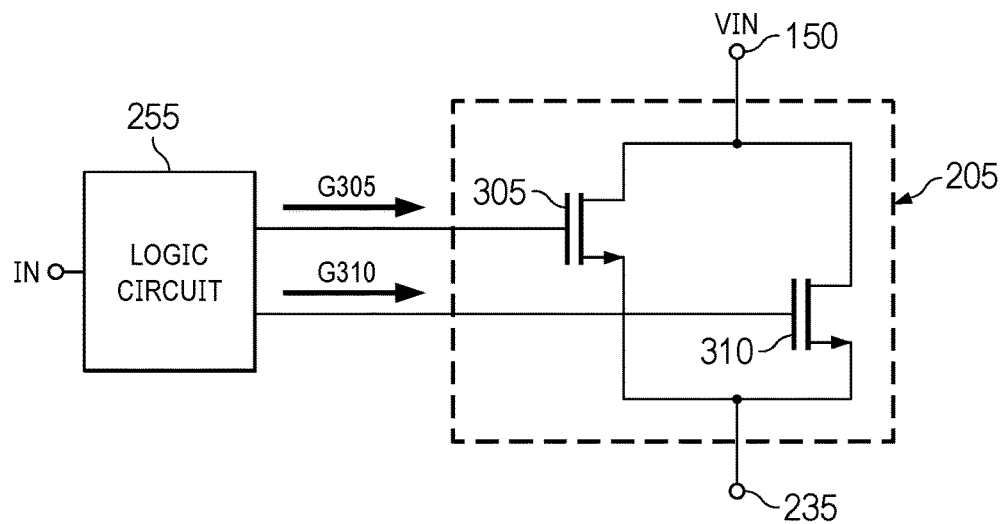
FIG. 3 is a schematic diagram of an example switching element in accordance with various examples.

When one of the switching elements 205, 210, 215, or 220 includes multiple parallel-coupled FETs, some of the FETs may be controlled to turn on while other of the FETs are controlled to turn, or remain, off. For example, referring now to FIG. 3, at least one implementation of the switching element 205 includes a FET 305 and a FET 310 and is coupled to, or adapted to couple, the logic circuit 255. While two FETs are shown in FIG. 3 as being a part of the switching element 205, in various implementations the switching element 205 may include any number of FETs coupled in parallel. In some examples, the FET 305 and the FET 310 have substantially a same size. In other examples, the FET 305 has a smaller size than the FET 310. As used herein, a size of a FET refers to a width measurement of the FET (e.g., a width or cross-sectional area of a semiconductor channel between a drain and a source of the FET). Accordingly, as briefly described above, as the size of a FET decreases, an on resistance of the FET (e.g., a drain-to-source resistance (RDS_on)) increases. During normal operation of the switching element 205, such as after a signal that exists at the node 235 has settled at a value, it may be operationally beneficial for a value of RDS_on to be reduced to the extent possible. For example, lower values of RDS_on will often result in reduced energy losses in the switching element 205. However, also as described above, ringing at the node 235 can increase as RDS_on decreases while the signal that exists at the node 235 is slewing up to, or down from, the value at which the signal settles during normal operation of the switching element 205. Therefore, during this slewing period it may be advantageous for RDS_on to be greater in value than during normal operation of the switching element 205. It may be further advantageous, in some implementations, to increase a slew rate of the signal that exists at the node 235 to increase efficiency and decrease energy losses associated with the switching element 205.

In at least some examples, the FET 305 is controlled to turn on for a period of time prior to the FET 310 being controlled to turn on. For example, responsive to receipt by the logic circuit 255 of a gate control signal (such as provided by the gate driver 128) for controlling the switching element 205 to turn on, the logic circuit 255 provides new gate control signals G305 and G310. In this example, G305 is a gate control signal for controlling the FET 305 and G310 is a gate control signal for controlling the FET 310. The logic circuit 255, in some examples, provides G310 as a delay version of G305. For example, responsive to receipt by the logic circuit 255 of an asserted gate control signal for controlling the switching element 205, the logic circuit 255 may provide G305 having an asserted value. After expiration of a predetermined, or programmed, period of time, the logic circuit 255 may then provide G310 having an asserted value. In this way, the FET 305 is turned on prior to the FET 310. In at least some examples, the predetermined or programmed period of time is an amount of time sufficient for a value of the signal that exists at the node 235 to rise to a predetermined vale (e.g., such as a percentage of a value that the signal will have while stable or at steady-state), for the signal to become stable (e.g., having ringing of less than a predefined amplitude), etc. The logic circuit 255 may have any suitable hardware architecture suitable for generating and providing G305 and G310 as described herein, the scope of which is not limited. In this way, during the period of time in which the FET 305 it turned on and the FET 310 is not turned on, an effective resistance that exists at the node 235 is increased as compared to after expiration of the period of time during which both the FET 305 and the FET 310 are turned on. The increased resistance reduces ringing at the node 235 based on a damping factor, as described above, as determined or measured at the node 235. Conversely, the effective resistance that exists at the node 235 is decreased responsive to the FET 310 being turned on in parallel with the FET 305, increasing efficiency and decreasing power loss due to RDS_on of the switching element 205 for a remainder of a duration of time that the logic circuit 255 receives an asserted gate control signal for controlling the switching element 205.

Figure 4:
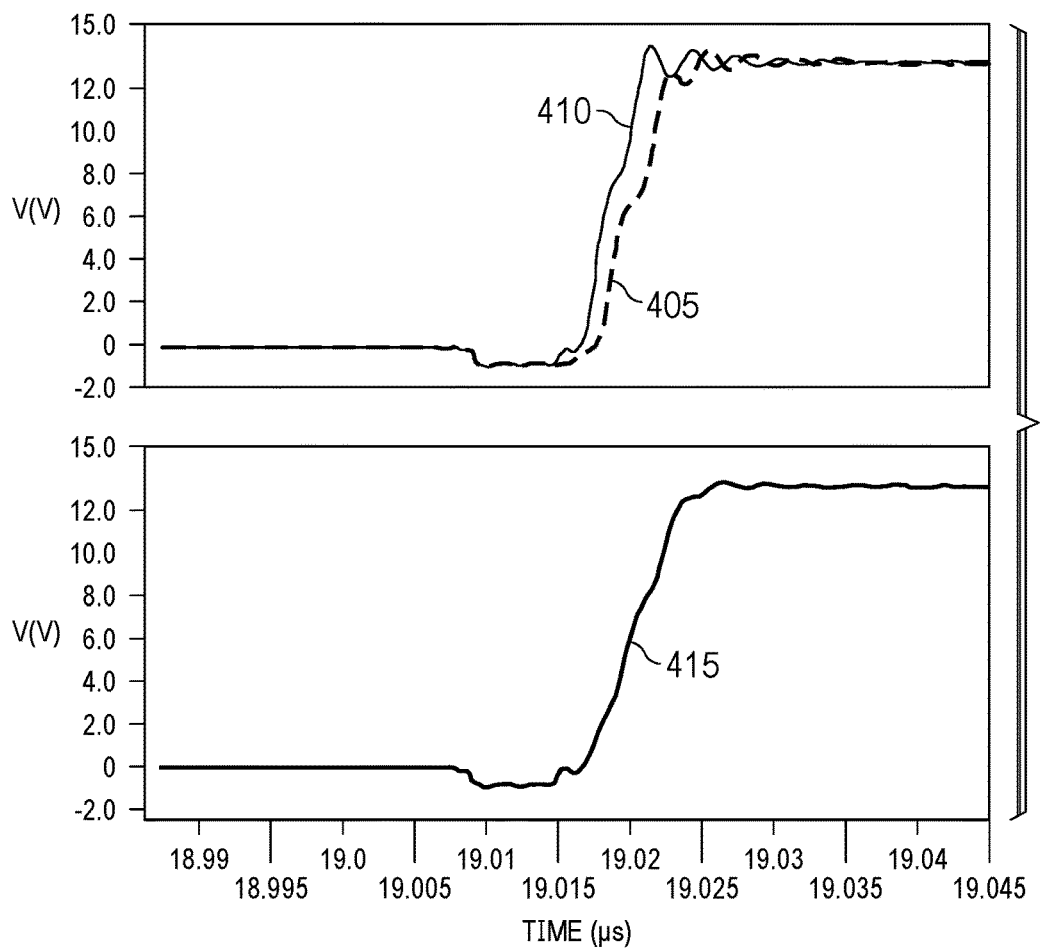
FIG. 4 is a diagram of example signal waveforms in accordance with various examples.

In other examples, the FET 305 and the FET 310 are controlled to both turn on for a first period of time, the FET 305 is controlled to remain turned on and the FET 310 is controlled to turn off for a second period of time, and the FET 305 is controlled to remain turned on and the FET 310 is controlled to turn back on for a third period of time. In at least some examples, the third period of time lasts for a remainder of a duration of time that the logic circuit 255 receives an asserted gate control signal for controlling the switching element 205. In this way, during the first period of time, an effective resistance that exists at the node 235 is reduced and a rising slew rate of a signal that exists at the node 235 (e.g., as sourced to the node 235 from the node 150 through the switching element 205) is increased, both when compared to the second period of time. This results in a rapid rise in value existing at the node 235 (e.g. high slew rate). Referring to FIG. 4, a diagram 400 of example signal waveforms is shown. The diagram 400 shows a comparison of ringing that exists at the node 235 in various examples of the power converter 104. For example, the signal 405 shows ringing that exists at the node 235 when the switching element 205 includes a single FET and the signal 410 shows ringing that exists at the node 235 when the switching element 205 includes two parallel-coupled FETs of different sizes that are controlled to turn on substantially simultaneously. The signal 415 shows ringing that exists at the node 235 when the switching element 205 includes two parallel-coupled FETs of different sizes, where a larger of the two FETs is turned on a preconfigured amount of time after the smaller of the two FETs is turned on.

As shown by the signals 405 and 410, when the switching element 205 includes one FET or two FETs turned on substantially simultaneously, substantial ringing exists at the node 235. However, as is shown by the signal 415, when the switching element 205 includes two FETs turned on sequentially with a delay, either the larger FET following the smaller FET or the smaller FET following the larger FET, ringing at the node 235 is reduced when compared to the hardware arrangements resulting in the signal 405 and the signal 410. Although not shown in FIG. 4, controlling both FETs of the switching element to turn on, followed by turning off the larger of the FETs, and finally again turning on both of the FETs may result in a signal substantially similar to the signal 415 with respect to ringing. However, such a signal may also have a higher slew rate (e.g., a more rapid rise in value), similar to the slew rate shown with respect to the signal 410.

Figure 5:
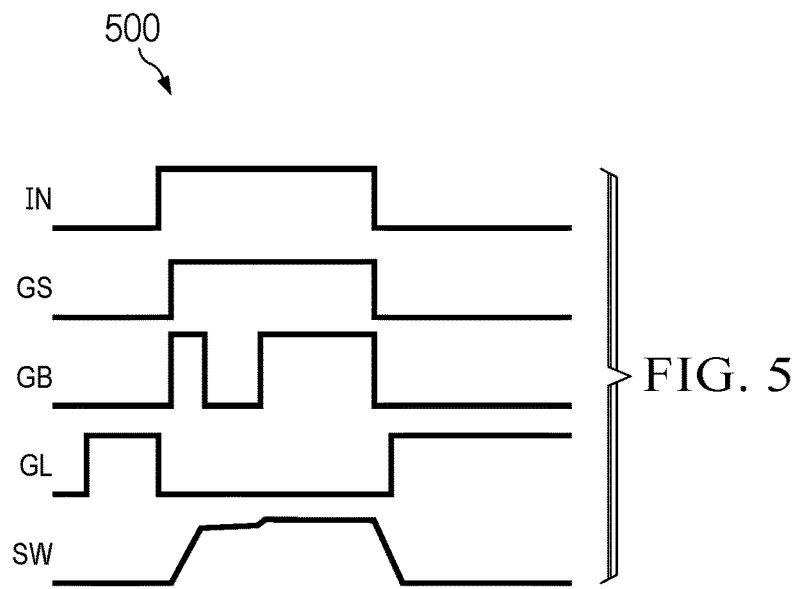
FIG. 5 is a diagram of example signal waveforms in accordance with various examples.

Referring to FIG. 5, a diagram 500 of example signals is shown. In at least some examples, the diagram 500 corresponds to signals that may be present in a power converter 104 according to this description. Accordingly, reference may be made to components or signals of any of the preceding figures herein when describing the diagram 500. In at least some examples, the diagram 500 shows signals In, GS, GB, GL, and SW. In is, in some examples, a pulse-width modulation (PWM) signal corresponding to control of the switching element 205. GS is, in some examples, a control signal provided by the logic circuit 255, based on In, to a gate of the FET 305 (either directly or via a driver). GB is, in some examples, a control signal provided by the logic circuit 255, based on In, to a gate of the FET 310 (either directly or via a driver). GL is, in some examples, a control signal provided by the logic circuit 255, based on In, to the switching element 210 (either directly or via a driver). SW is, in some examples, representative of the signal that exists at the node 235.

Responsive to In being asserted, the switching element 205 is turned on. Responsive to In being de-asserted, the switching element 205 is turned off. In at least some examples, responsive to receiving In having an asserted value, the logic circuit 255 provides GS having an asserted value. In some examples of the switching element 205, responsive to the logic circuit 255 providing GS having an asserted value, the logic circuit 255 also provides GB having an asserted value for a preconfigured amount of time, such as an amount of time configured to enable a value of a signal existing at the node 235 to reach about 80 percent, or more, of its steady-state value. As used herein, the steady-state value is reached responsive to at least one component (e.g., the FET 305 or the FET 310) of the switching element 205 operating in a linear region of operation. At an expiration of the preconfigured time, the logic circuit 255 de-asserts GB while maintaining an asserted value of GS. At the expiration of a second preconfigured time, having begun based on assertion of GS, the logic circuit 255 again asserts GB until In becomes de-asserted. The second preconfigured time is, in some examples, an amount of time configured to enable the signal existing at the node 235 to settle to a steady-state value substantially free of ringing. In this way, the second preconfigured time is dependent on inductance, capacitance, and resistance as measured at the node 235. In some examples, the logic circuit 255 provides GL having an inverse value of GS such that responsive to GS being asserted, GL is de-asserted, and vice versa. As shown by SW, responsive to GS and GB both being asserted based on In, SW increases rapidly in value with the rise in value of SW slowing responsive to GB being de-asserted and GS remains asserted. Subsequently, responsive to SW settling to its steady-state value, GB is re-asserted.

Figure 6:
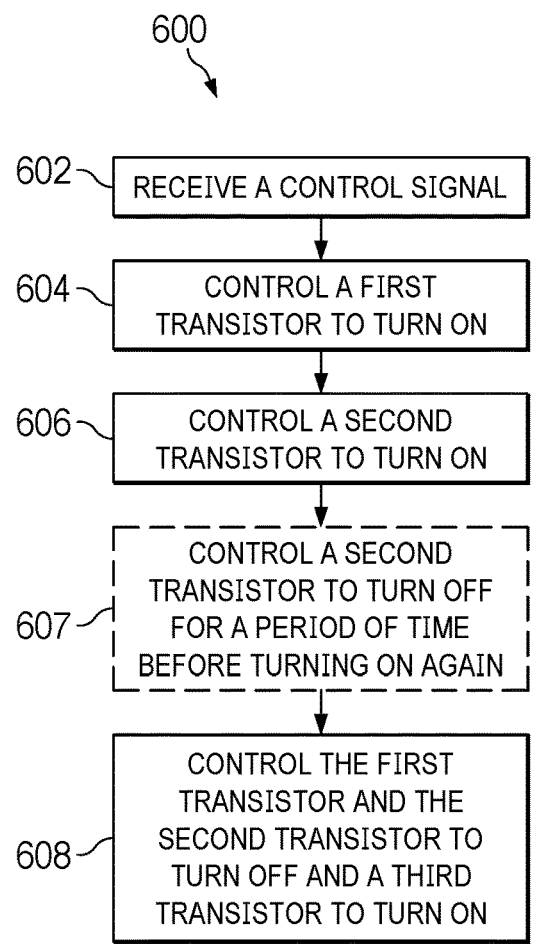
FIG. 6 is a flowchart of an example method in accordance with various examples.

Referring to FIG. 6, a flowchart of an example method 600 is shown. In at least some examples, the method 600 is representative of control of a switching element, such as the switching element 205 of the power converter 104. Accordingly, reference may be made to components or signals of any of the preceding figures herein when describing the method 600.

At operation 602, a control signal is received. In at least some examples, the control signal is a PWM signal, such as In described above with respect to FIG. 5. The control signal, in at least some examples, is for controlling a high-side power transistor, or switching element, of a power converter.

At operation 604, a logic circuit controls a first transistor to turn on. The first transistor is, in some examples, one of multiple parallel-coupled transistors that together function as a high-side switching element of the power converter, such as the switching element 205 of the power converter 104. The first transistor is, in some examples, the FET 305. In at least some examples, the first transistor is smaller in size (e.g., transistor length) than at least some other of the multiple parallel-coupled transistors.

At operation 606, the logic circuit controls a second transistor to turn on. The second transistor is, in some examples, another of multiple parallel-coupled transistors that together function as the high-side switching element of the power converter, such as the switching element 205 of the power converter 104. The second transistor is, in some examples, the FET 310. In at least some examples, the first transistor is larger in size (e.g., transistor length) than at least some other of the multiple parallel-coupled transistors, such as the first transistor. In at least some examples, the second transistor is turned on substantially simultaneously with the first transistor. In other examples, the second transistor is turned on after a period of time has passed after the first transistor was turned on. The period of time is, in some examples, a period of time preconfigured or preprogrammed to be sufficient for a value of a signal existing at source terminals of the first and second transistors to have reached a steady-state value (e.g., have substantially no ringing such that the value is approximately steady).

At operation 607, which is an optional operation that occurs if the first transistor was turned on at operation 606 substantially simultaneously with the first transistor, the logic circuit controls a second transistor to turn off for a period of time before again turning on. In at least some examples, operation 607 is performed a preconfigured or preprogrammed amount of time after operation 606 is initiated, such as a preconfigured or preprogrammed amount of time sufficient to enable a value of a signal existing at source terminals of the first and second transistors to reach a predetermined percentage (e.g., such as about 80-90%) of its steady-state value. The period of time for which the first transistor is then controlled to turn off is, in some examples, a period of time preconfigured or preprogrammed to be sufficient for a value of a signal existing at source terminals of the first and second transistors to have reached a steady-state value (e.g., have substantially no ringing such that the value is approximately steady).

At operation 608, the logic circuit controls the first transistor and the second transistor to turn off and controls a third transistor to turn on. In at least some examples, the third transistor is a low-side switching element, such as the switching element 210. Operation 608 is performed, in at least some examples, responsive to a state change in the control signal that was received at operation 602. For example, if the control signal received at operation 602 was received having an asserted value, responsive to the control signal becoming de-asserted the operation 608 is performed.

While the operations of the method 600 described herein have been described and labeled with numerical reference, in various examples, the method 600 includes additional operations that are not recited herein. In some examples, any one or more of the operations recited herein include one or more sub-operations. In some examples, any one or more of the operations recited herein is omitted. In some examples, any one or more of the operations recited herein is performed in an order other than that presented herein (e.g., in a reverse order, substantially simultaneously, overlapping, etc.). Each of these alternatives falls within the scope of this description.

While switching elements have generally been described herein as having two parallel-coupled transistors, where one transistor is smaller than the other transistor, such is merely one example of a switching element. Other switching elements suitable for implementation according to this description may have any number of parallel-coupled transistors controlled in a manner similar to that described herein. Those transistors may have any size relationship to each other such that at least one of the transistors is smaller than other of the transistors or at least one of the transistors is larger than the other transistors. Each of these alternatives falls within the scope of this description.

In this description, the term "couple" may cover connections, communications or signal paths that enable a functional relationship consistent with this description. For example, if device A provides a signal to control device B to perform an action, then: (a) in a first example, device A is directly coupled to device B; or (b) in a second example, device A is indirectly coupled to device B through intervening component C if intervening component C does not substantially alter the functional relationship between device A and device B, so device B is controlled by device A via the control signal provided by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third party.

While certain components may be described herein as being of a particular process technology, these components may be exchanged for components of other process technologies. Circuits described herein are reconfigurable to include the replaced components to provide functionality at least partially similar to functionality available before the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in in parallel between the same nodes. For example, a resistor or capacitor shown and described herein as a single component may instead be multiple resistors or capacitors, respectively, coupled in series between the same two nodes as the single resistor or capacitor.

Uses of the phrase "ground voltage potential" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value. Modifications are possible in the described examples, and other examples are possible within the scope of the claims.

What is claimed is:

1. An apparatus, comprising:
a control circuit having a control input and first and second power converter control outputs, the control circuit configured to:
receive an input signal at the control input;
responsive to the input signal having a first input state:
provide a first control signal at the first power converter control output, in which the first control signal has a first control state; and
provide a second control signal at the second power converter control output, in which the second control signal has multiple transitions from a second control state to the first control state; and
responsive to the input signal switching from the first input state to a second input state, set the first and second control signals to the second control state.

2. The apparatus of claim 1, wherein the control circuit has a third power converter control output and configured to:
responsive to the input signal having the first input state, provide a third control signal at the third power converter control output, in which the third control signal has the second control state; and
responsive to the input signal having the second input state, set the third control signal to the first control state.

3. The apparatus of claim 2, further comprising:
a first transistor having a first control terminal and first and second current terminals, the first control terminal coupled to the first power converter control output, the first current terminal coupled to an input power terminal, and the second current terminal coupled to a switching terminal;
a second transistor having a second control terminal and third and fourth current terminals, the second control terminal coupled to the second power converter control output, the third current terminal coupled to the input power terminal, and the fourth current terminal coupled to the switching terminal; and
a third transistor having a third control terminal and fifth and sixth current terminals, the third control terminal coupled to the third power converter control output, the fifth current terminal coupled to the switching terminal, and the sixth current terminal coupled to a ground terminal,
wherein:
the first transistor is configured to be turned on responsive to the first control signal having the first control state, and turned off responsive to the first control signal having the second control state;
the second transistor is configured to be turned on responsive to the second control signal having the first control state, and turned off responsive to the second control signal having the second control state; and
the third transistor is configured to be turned on responsive to the third control signal having the first control state, and turned off responsive to the third control signal having the second control state.

4. The apparatus of claim 1, wherein the input signal includes a pulse-width modulation signal.

5. The apparatus of claim 1, further comprising:
a first transistor having a first control terminal and first and second current terminals, the first control terminal coupled to the first power converter control output, the first current terminal coupled to an input power terminal, and the second current terminal coupled to a switching terminal; and
a second transistor having a second control terminal and third and fourth current terminals, the second control terminal coupled to the second power converter control output, the third current terminal coupled to the input power terminal, and the fourth current terminal coupled to the switching terminal,
wherein the first transistor is configured to be turned on responsive to the first control signal having the first control state, and turned off responsive to the first control signal having the second control state; and
wherein the second transistor is configured to be turned on responsive to the second control signal having the first control state, and turned off responsive to the second control signal having the second control state.

6. The apparatus of claim 5, wherein the control circuit is configured to, responsive to the input signal having the first input state: provide the second control signal having a first transition from the second control state to the first control state, a second transition from the first control state to the second control state, and a third transition from the second control state to the first control state, in which the second transition is between the first and third transitions.

7. The apparatus of claim 6, wherein the first and second transitions are separated by a duration of time, in which the duration reflects a target voltage of the switching terminal if the input signal is in the first input state.

8. An apparatus, comprising:
a first switching element including:
a first transistor having a first control terminal and first and second current terminals, the first current terminal coupled to an input power terminal, and the second current terminal coupled to a switching terminal, and the first transistor configured to be turned on responsive to the first control terminal having a first control state and turned off responsive to the first control terminal having a second control state; and
a second transistor having a second control terminal and third and fourth current terminals, the third current terminal coupled to the input power terminal, and the fourth current terminal coupled to the switching terminal, and the second transistor configured to be turned on responsive to the second control terminal having the first control state and turned off responsive to the second control terminal having the second control state;
a second switching element including a third transistor, the third transistor having a third control terminal and fifth and sixth current terminals, the fifth current terminal coupled to the switching terminal, and the sixth current terminal coupled to a ground terminal, and the third transistor configured to be turned on responsive to the third control terminal having the first control state and turned off responsive to the third control terminal having the second control state; and a control circuit having a control input and first, second, and third control outputs, the first control output coupled to the first control terminal, the second control output coupled to the second control terminal, the third control output coupled to the third control terminal, and the control circuit configured to:

receive an input signal at the control input;

responsive to the input signal having a first input state:

provide a first control signal at the first control output, in which the first control signal has the first control state;

provide a second control signal at the second control output, in which the second control signal has multiple transitions from the second control state to the first control state; and provide a third control signal at the third control output, in which the third control signal has the first control state; and responsive to the input signal switching from the first input state to a second input state, set the first, second, and third control signals to the second control state.

9. The apparatus of claim 8, further comprising an energy storage element coupled between the switching terminal and an output power terminal.

10. The apparatus of claim 8, wherein the control circuit is configured to, responsive to the input signal having the first input state: provide the second control signal having a first transition from the second control state to the first control state, a second transition from the first control state to the second control state, and a third transition from the second control state to the first control state, in which the second transition is between the first and third transitions.

11. The apparatus of claim 10, wherein the first transistor has a larger turn-on resistance than the second transistor.

12. The apparatus of claim 11, wherein the first and second transitions are separated by a duration of time, in which the duration reflects a target voltage of the switching terminal if the input signal is in the first input state.

13. The apparatus of claim 10, wherein the first transistor has a smaller width than the second transistor.

14. The apparatus of claim 8, wherein the control circuit has a fourth control output, and the second switching element includes a fourth transistor, the fourth transistor having a fourth control terminal and seventh and eighth current terminals, the fourth control terminal coupled to the fourth control output, the seventh current terminal coupled to the switching terminal, and the eighth current terminal coupled to the ground terminal.

15. The apparatus of claim 8, wherein the input signal includes a pulse-width modulation signal.

16. An apparatus, comprising:

a switching element including:

a first transistor having a first control terminal and first and second current terminals, the first current terminal coupled to an output power terminal, and the second current terminal coupled to a switching terminal, and the first transistor configured to be turned on responsive to the first control terminal having a first control state and turned off responsive to the first control terminal having a second control state; and a second transistor having a second control terminal and third and fourth current terminals, the third current terminal coupled to an input power terminal, and the fourth current terminal coupled to the switching terminal, and the second transistor configured to be turned on responsive to the second control terminal having the first control state and turned off responsive to the second control terminal having the second control state; and a control circuit having a control input and first and second control outputs, the first control output coupled to the first control terminal, the second control output coupled to the second control terminal, and the control circuit configured to:

receive an input signal at the control input;

responsive to the input signal having a first input state:

provide a first control signal at the first control output, in which the first control signal has the first control state; and provide a second control signal at the second control output, in which the second control signal has multiple transitions from the second control state to the first control state; and responsive to the input signal switching from the first input state to a second input state, set the first and second control signals to the second control state.

17. The apparatus of claim 16, further comprising an energy storage element coupled between the input power terminal and the switching terminal.

18. The apparatus of claim 17, wherein the switching element is a first switching element, and the apparatus further comprises:

a second switching element coupled between the switching terminal and a ground terminal;

a third switching element coupled between the input power terminal and the energy storage element; and a fourth switching element coupled between the energy storage element and the ground terminal.

19. The apparatus of claim 16, wherein the control circuit is configured to, responsive to the input signal having the first input state: provide the second control signal having a first transition from the second control state to the first control state, a second transition from the first control state to the second control state, and a third transition from the second control state to the first control state, in which the second transition is between the first and third transitions.

20. The apparatus of claim 19, wherein the first and second transitions are separated by a duration of time, in which the duration reflects a target voltage of the switching terminal if the input signal is in the first input state.

* * * * *